UNITED STATES PATENT OFFICE.

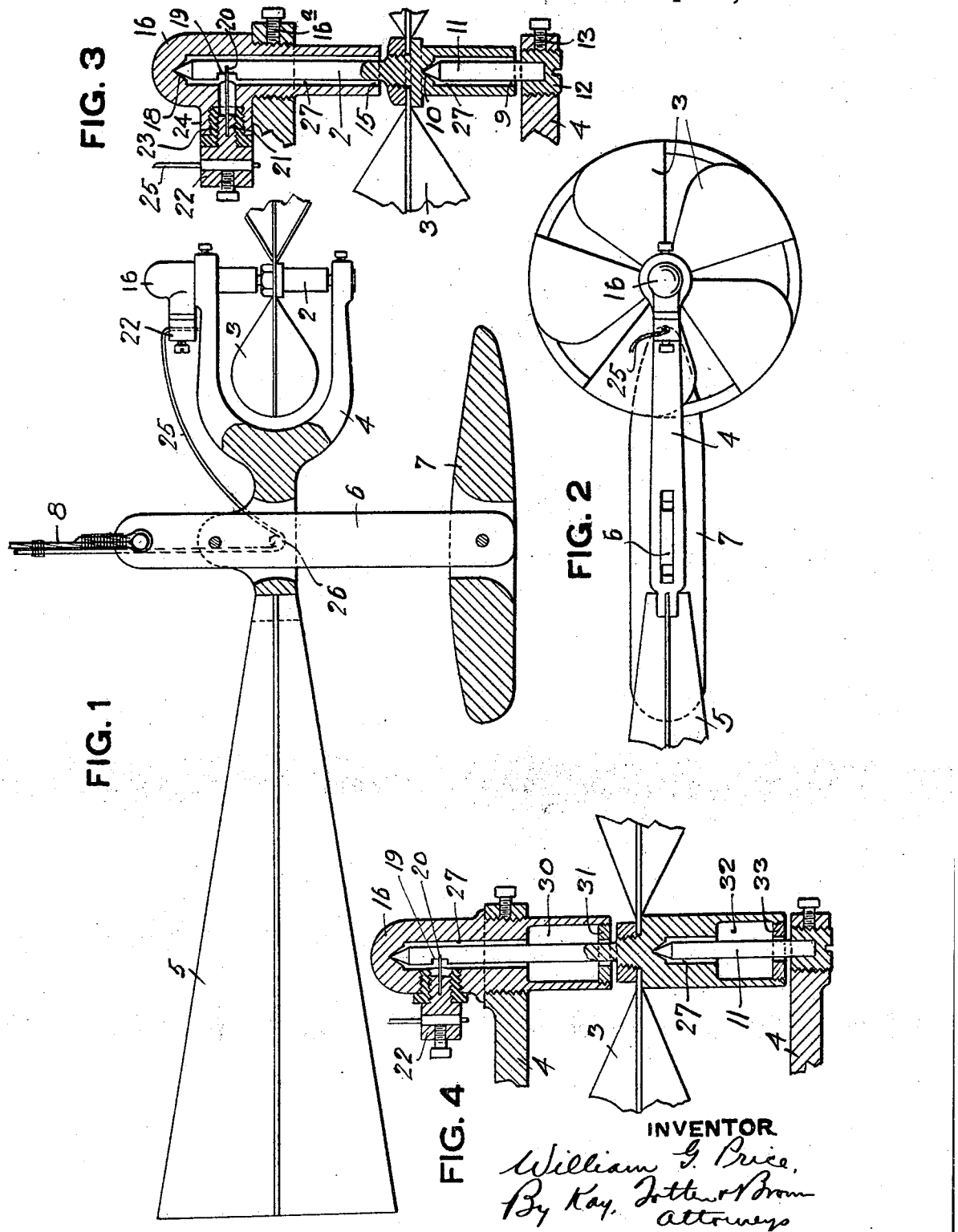

WILLIAM G. PRICE, OF YAKIMA, WASHINGTON.

CURRENT METER.

1,413,355.   Specification of Letters Patent.   Patented Apr. 18, 1922.

Application filed August 19, 1920. Serial No. 404,697.

*To all whom it may concern:*

Be it known that I, WILLIAM G. PRICE, a citizen of the United States, and resident of Yakima, in the county of Yakima and State of Washington, have invented a new and useful Improvement in Current Meters; and I do hereby declare the following to be a full, clear, and exact description thereof.

My invention relates to current meters for use in measuring the flow of streams and for similar purposes and it has for its object to improve the accuracy of instruments of this character by providing the instrument with bearings having small and constant friction, and by effectively protecting the bearings from contact with water, dirt or other foreign substances.

In the construction heretofore employed for current-flow meters that depend for their operation upon the rotation of a spindle, the bearings of the spindle have been imperfectly protected from contact with the fluid that is being measured, and in the measurement of turbid streams the accuracy of the instrument is often impaired by grit and dirt carried into the bearings by the water. This increases the friction between the moving parts and so causes the instrument to read incorrectly, and may damage the bearing surfaces and wear away the electric contact members by means of which the rotations of the spindle are counted. The bearing at the upper end of the vertical spindle has been so mounted that it can move vertically during its rotation and this is another source of inaccuracy because the area of frictional contact in the bearings is thereby changed, with corresponding change in the amount of friction, especially if grit and dirt are present.

According to my present invention I provide the rotating spindle with upper and lower bearings of the inverted-cup type, both of these bearings being disposed within sleeves or tubes which are so arranged that when the instrument is immersed in water, the water cannot penetrate to the bearing surfaces.

In the accompanying drawing, Fig. 1 is a side view, partly in elevation and partly in vertical section, showing an instrument constructed in accordance with my invention; Fig. 2 is a plan view of the instrument shown in Fig. 1; Fig. 3 is a vertical sectional view through the spindle and its associated parts; and Fig. 4 is an enlarged vertical sectional view similar to Fig. 3, but showing a modified form of spindle construction.

The instrument shown in the drawing comprises a vertical spindle 2 carrying a set of cups 3 and supported in bearings in a forked support 4 that also carries a set of vanes 5. The support 4 is pivotally secured to a flat rod or hanger 6 to the lower end of which is secured a cigar-shaped weight 7, while the upper end of the hanger is adapted to be suspended from a rope or other suspension means 8. The general construction thus far described is commonly employed in current-flow meters and is here shown to illustrate the details of my invention, which is particularly concerned with the construction of the vertical spindle 2 and of the bearings for this spindle.

The lower end of the spindle is provided with a tubular opening 9 drilled lengthwise in the axis of the spindle and provided at its inner or upper end with a conical bearing seat 10 which rests upon the conical upper end of a bearing pin 11, the lower end of which is received in a nut 12 carried by the lower arm of the support 4 and adapted to be screwed up or down to adjust the vertical position of the spindle 2. A set-screw 13 is provided to secure the nut 12 in its adjusted position.

The portion of the spindle 2 above the cups 3 extends into an opening 15 formed at the lower end of a bearing member 16 that is screw-threaded on its outer surface and is received in a screw-threaded opening in the upper arm of the support 4 and secured in position therein by means of a set-screw 16ª. The upper end of the member 16 is closed and is provided with a conical bearing seat 18, which receives the pointed upper end of the spindle 2.

A short distance below its upper end, the spindle 2 is provided with a notch 19 adjacent to which is a spring contact finger 20 that extends through a bushing 21 of hard rubber or other suitable electrical insulating material and is secured to a binding post 22 that is provided with a screw-threaded portion 23 of insulating material which is screwed into a suitable projection 24 formed on the side of the bearing member 16. A lead wire 25 is connected to the binding post 22 and extends around a pin 26 on the vertical hanger 6 and thence up to the usual recording instrument. The notch 19 may be filled with insulating material or may be left open as desired.

The diameter of the opening 15 in the member 16 is but slightly larger than the diameter of the spindle 2. Similarly, the diameter of the opening 9 in the lower end of the spindle is but slightly larger than the diameter of the bearing pin 11. Annular capillary passages 27 are thus provided below each of the bearing seats 10 and 18 and I prefer to introduce a small quantity of oil into each of these passages in order to give additional protection against the entrance of water. However, even if the oil is omitted, water cannot reach the bearing seats because each of the bearing seats is at the upper end of a closed chamber and if water enters the lower ends of these chambers the compression of the air within these chambers will keep the water from rising high enough to reach the bearings.

Fig. 4 shows a modified form of spindle construction in which the tubular bearing member 16, instead of having its internal bore of uniform diameter, is bored out as shown at 30 for some distance from its lower end. The bottom of the opening 30 may be nearly closed, as by means of a ring 31, or this ring may be omitted. The lower end of the spindle may also, if desired, be provided with a similar enlarged opening 32 which may be nearly closed by means of a ring 33.

The function of the enlarged openings 30 and 32 is to enclose a larger volume of air than is admitted by the capillary space 27 shown at the upper end of the spindle. This air is compressed by the water into the annular space 27 and prevents the water, with the grit it carries, from running up to the contact spring finger 20. The friction between this spring and the spindle will then be a constant quantity and there will be no grit to wear off the end of the spring 20. This construction keeps the water away from the bearing point 18 and the spring 20 when the instrument is immersed in water up to 100 feet or more in depth.

The operation of my improved meter takes place as in the usual meters of this type, the instrument being immersed in the stream or other body of fluid to be measured. The vanes 5 and the weight 7 cause the meter to assume an upright position, with the spindle end upstream. The flowing water acts through the cups 3 to rotate the spindle 2 and the rotations of the spindle are counted by the making and breaking of the electric circuit between the contact member 20 and the notched portion 19 of the spindle. By reason of the construction described above, the water, with the grit which it usually contains, cannot reach the bearings of the spindle and increase the friction or wear away the bearing surfaces. Therefore, the instrument will operate accurately for an indefinite period.

The spindle may be readily adjusted by loosening the set-screw 13 and turning the nut 12, which acts to move the bearing pin 11, and with it the spindle 2. This adjustment should be such that the upper end of the spindle nearly touches the bearing seat 18 but without binding the spindle.

If it is desired to suspend the meter from a rigid support instead of from a rope or other flexible suspension, the hanger 6 may be removed and replaced by a flat rod long enough to reach to the surface of the body of water, the flow of which is to be measured. In this case, the rod should be of the same size and shape in cross section as the hanger 6, in order to present the same resistance to the current flow as the hanger 6. This is necessary in order that the rating of the meter shall be the same whether the instrument be suspended from a rope or from a rod.

In previous meters of this general type, the spindle rises in the meter frame, through being forced against the conical point of the lower bearing pin by the pressure of the moving water against the wheel cups. This causes the inner surface of the lower spindle tube to rest against the side of the bearing pin, thereby greatly increasing the friction in the bearing and so causing the meter to read incorrectly. In my improved construction such movement of the spindle is prevented by the upper bearing seat 18, and the friction in the bearing is kept small and constant.

What I claim is:

1. A current meter comprising a vertical spindle that is rotatably supported by two inverted-cup bearings.

2. A current meter comprising a vertical spindle that is rotatably supported by two inverted-cup bearings, and means for preventing access of liquid to the said bearings.

3. A current meter comprising a vertical spindle having a pointed upper end, an annular bearing member enclosing the said upper end of the spindle, the said annular member having an internal diameter only slightly larger than the diameter of the said spindle and having its upper end closed and provided with a bearing recess adapted to receive the said pointed upper end of the said spindle.

4. A current meter comprising a vertical spindle having a pointed upper end and having in its lower end an axial opening, a bearing pin received in the said opening, and an annular bearing member enclosing the upper end of the said spindle, the said annular member having an internal diameter only slightly larger than the diameter of the said spindle and having its upper end closed and provided with a bearing recess adapted to receive the upper end of the said spindle.

5. A current meter comprising a vertical spindle having a bearing at its upper end, and an annular member surrounding the said spindle below the said bearing and having a restricted diameter adjacent to the said bearing and an enlarged diameter below the said restricted portion.

6. A current meter comprising a vertical spindle having a pointed upper end and having in its lower end an axial opening, a bearing pin received in the said opening, an annular bearing member enclosing the upper end of the said spindle, the said annular member having an internal diameter only slightly larger than the diameter of the said spindle and having its upper end closed and provided with a bearing recess adapted to receive the upper end of the said spindle, the said annular member also having a portion of enlarged diameter below the said bearing.

7. A current meter comprising a rotatable vertical spindle having a pointed upper end and having in its lower end an axial opening provided with a conical bearing seat, a vertically adjustable bearing pin received in the said opening and provided with a pointed end received in the said bearing seat, and an annular bearing member enclosing the upper end of the said spindle, the said annular member having an internal diameter only slightly larger than the diameter of the said spindle and having its upper end closed and provided with a conical bearing seat for receiving the pointed upper end of the said spindle.

In testimony whereof, I, the said WILLIAM G. PRICE, have hereunto set my hand.

WILLIAM G. PRICE.

Witnesses:
JOHN F. WILL,
J. R. KELLER.